(12) United States Patent
Mitchell et al.

(10) Patent No.: US 9,741,145 B2
(45) Date of Patent: Aug. 22, 2017

(54) AUGMENTED REALITY SIMULATION CONTINUUM

(75) Inventors: Kenny Mitchell, Addlestone (GB); Rafael C. Hostettler, Zurich (CH); Stelian Coros, Zurich (CH); Robert Sumner, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 490 days.

(21) Appl. No.: 13/538,699

(22) Filed: Jun. 29, 2012

(65) Prior Publication Data
US 2014/0002493 A1   Jan. 2, 2014

(51) Int. Cl.
*G06T 13/20* (2011.01)
*G06T 19/00* (2011.01)

(52) U.S. Cl.
CPC ............ *G06T 13/20* (2013.01); *G06T 19/006* (2013.01); *G06T 2210/21* (2013.01)

(58) Field of Classification Search
CPC ........... G09G 5/00; G06T 19/00; G06T 13/20; G06T 19/006; G06T 2210/21
USPC .......................... 345/473, 619, 633, 949, 952
See application file for complete search history.

(56) References Cited

U.S. PATENT DOCUMENTS

| | | | |
|---|---|---|---|
| 7,394,459 B2* | 7/2008 | Bathiche | A63F 13/00 345/156 |
| 7,427,996 B2* | 9/2008 | Yonezawa | G06T 19/006 345/629 |
| 2002/0021283 A1* | 2/2002 | Rosenberg | A63F 13/285 345/156 |
| 2008/0252607 A1* | 10/2008 | De Jong | G06F 3/016 345/173 |
| 2012/0113223 A1 | 5/2012 | Hilliges et al. | |
| 2012/0249443 A1* | 10/2012 | Anderson | A63F 13/06 345/173 |
| 2013/0286004 A1* | 10/2013 | McCulloch et al. | 345/419 |

FOREIGN PATENT DOCUMENTS

| | | | | |
|---|---|---|---|---|
| JP | 11-088913 | * | 1/1997 | ............. H04N 13/04 |
| JP | 11088913 A2 | | 3/1999 | |
| JP | 2000-352960 A | | 12/2000 | |
| JP | 2006072667 A | * | 3/2006 | |

(Continued)

OTHER PUBLICATIONS

Breen et al., "Interactive Occlusion and Collision of Real and Virtual Objects in Augmented Reality", Technical Report ECRC-95-02, 1995, European Computer-Industry Research Center GmbH, Munich, Germany, 22 pages.*

(Continued)

*Primary Examiner* — Gregory J Tryder
*Assistant Examiner* — Michael Le
(74) *Attorney, Agent, or Firm* — Patterson + Sheridan, LLP

(57) ABSTRACT

Techniques for simulating interactions using an augmented reality device are described. Embodiments capture a visual scene for display, wherein the visual scene is captured using one or more camera devices. Embodiments simulate a dynamic interaction between the first physical object and one or more virtual objects. Additionally, a sequence of frames is rendered for display that depicts the simulated dynamic interaction the first physical object and the one or more virtual objects.

24 Claims, 6 Drawing Sheets

(56) References Cited

FOREIGN PATENT DOCUMENTS

JP      2009-217328 A    9/2009
KR      1020090056792    6/2009

OTHER PUBLICATIONS

Daniel G. Aliaga, "Virtual Objects in the Real World", Communications of the ACM (CACM), vol. 40. No. 3., pp. 49-54, Mar. 1997.*
JP 2006-072667A (Machine Translation on Sep. 4, 2015).*
NPL_Japan Patent Office, Office Action issued Apr. 30, 2014.
Willis, Karl D. D. et al., Motion Beam: Designing for Movement with Handheld Projectors, Proceedings of the 28th of the international conference extended abstracts on Human factors in computing systems, 2010, ACM, New York, New York, United States.
Korean Notice of Preliminary Rejection for Application No. 10-2013-76019, Nov. 17, 2014.
Ohshima T et al: "AR<2>Hockey: a case study of collaborative augmented reality", Virtual Reality Annual International Symposium, 1998, Proceedings, IEEE 1998, Atlanta, GA, USA, Mar. 14-18, 1998, Los Alamitos, CA, USA, IEEE Comput. Soc, US, Mar. 14, 1998 (Mar. 14, 1998), pp. 268-275.
Andrew Dolce et al: "ARmy: A study of multi-user interaction in spatially augmented games", Computer Vision and Pattern Recognition Workshops (CVPRW), 2012 IEEE Computer Society Conference on, IEEE, Jun. 16, 2012 (Jun. 16, 2012), pp. 43-50.
Extended European Search Report for EP 13174392.4, Jan. 12, 2016.

* cited by examiner

AUGMENTED REALITY SIMULATION CONTINUUM

BACKGROUND

Field of the Invention

The present invention generally relates to a human-computer interface and more specifically to techniques for simulating dynamic interactions on an augmented reality device.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

Many hand-held gaming devices include some form of camera device which may be used to capture an image or a series of images of a physical, real-world scene. The captured images can then be displayed, for instance, on a display of the hand-held gaming device. In augmented reality devices, these captured images can be modified to include additional content, such as virtual objects. However, when the physical objects being photographed move over a series of frames, these physical objects may appear to interact unrealistically (or not at all) with the inserted virtual objects. Likewise, when the virtual objects move within the displayed scene, the virtual objects may not interact in an ideal fashion with the physical objects shown in the scene.

SUMMARY

Embodiments provide a method, augmented reality device and computer-readable storage medium for simulating interactions using an augmented reality device. The method, augmented reality device and computer-readable storage medium include capturing a visual scene for display, where the visual scene is captured using one or more camera devices. The method, augmented reality device and computer-readable storage medium further include simulating a dynamic interaction between the first physical object and one or more virtual objects. The method, augmented reality device and computer-readable storage medium also include rendering a sequence of frames for display that depict the simulated dynamic interaction the first physical object and the one or more virtual objects.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
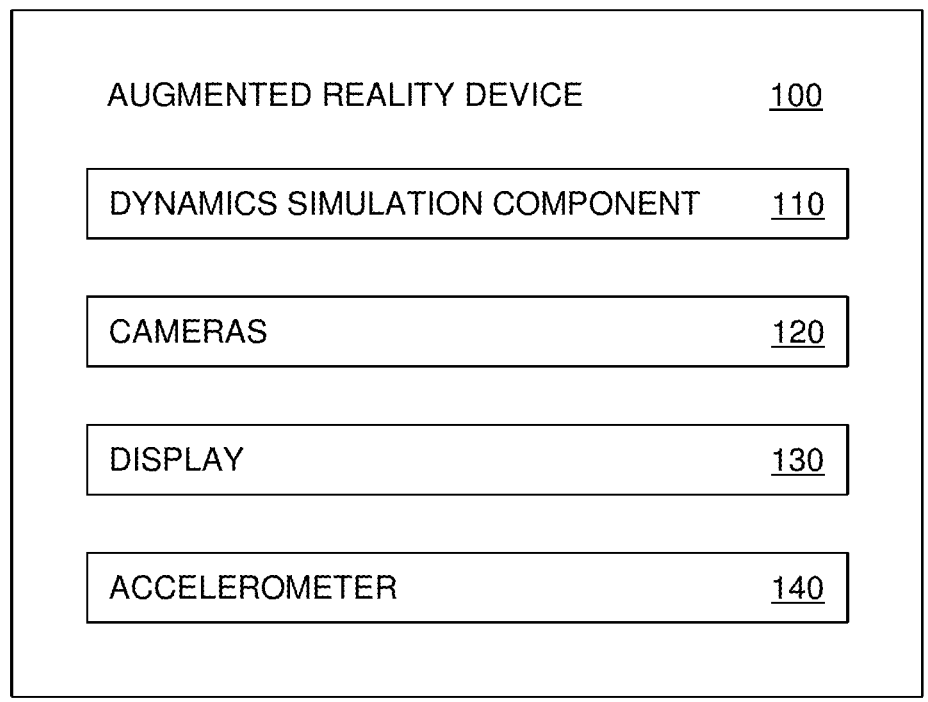
FIG. 1 is a block diagram illustrating an augmented reality device configured with a dynamics simulation component, according to one embodiment described herein.

Embodiments described herein generally relate to techniques for displaying content on an augmented reality device. As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. This augmented view of the real world may be referred to herein as an "augmented reality world" or an "augmented reality space."

Such an augmented reality device may include a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located. Continuing the above example, as the user points the camera of the augmented reality device at the physical coffee cup on the table from different angles, the user may instead see different angles of the virtual cartoon coffee cup displayed on the augmented reality device.

One challenge for augmented reality devices is that the virtual objects displayed on the augmented reality device may not interact realistically with objects within the physical real-world environment. That is, on augmented reality devices where virtual objects are only inserted into a captured scene in addition to or in place of physical objects within the captured scene, these devices may not realistically display interactions between the virtual and physical objects or account for dynamics effects resulting from these interactions. As described herein, dynamics refers to the motion of objects (including both physical and virtual objects) as a result of energy or forces being applied to the objects. For instance, an augmented reality device configured to replace a coffee cup on a physical table with an animated cartoon coffee cup without performing any dynamics simulation may depict less realistic interactions between physical objects (e.g., a user's hand) and the inserted cartoon coffee cup, as the animated coffee cup may not respond in a realistic fashion to the interaction by the physical object. As another example, an augmented reality device that inserts a virtual ball into a visual scene without accounting for the dynamics of the virtual ball may appear less realistic to users, as physical objects (e.g., a physical ball) may appear to simply move through the virtual ball (and vice versa), without any interaction.

Embodiments described herein provide techniques for simulating interactions using an augmented reality device are described. For instance, software residing on a handheld device may receive a visual scene for display. Such a visual scene may include, for instance, a plurality of frames depicting a physical real-world environment and captured using one or more cameras of the augmented reality device. The software may further identify a physical object within the visual scene. As an example, the software could identify a ball resting upon a table within the captured visual scene. Additionally, the software could identify one or more virtual objects to display within the scene. For instance, a particular augmented reality device could be configured to insert a virtual ball into the scene. The software may then simulate dynamics of interactions between the physical object and the one or more virtual objects within the visual scene.

For example, the user could physically roll the physical ball on the table, such that the physical ball appears to collide with the virtual ball in the visual scene displayed on the augmented reality device. In this scenario, the augmented reality device could be configured with a dynamics simulation component that determines when the physical ball collides with the virtual ball within the augmented reality scene displayed by the augmented reality device. When this occurs, the dynamics simulation component could simulate a reaction of the virtual ball using a set of dynamics rules and display the reaction of the virtual ball on the augmented reality device. For example, the augmented reality device could depict the virtual ball rolling across the table, in response to the virtual ball colliding with the physical ball. Doing so provides a more realistic augmented reality scene on the augmented reality device, which in turn may enhance the user's interactions with the augmented reality device.

In a particular embodiment, software on the augmented reality device could determine one or more physical characteristics of a physical surface within the scene. For instance, such physical characteristics could include a measure of friction, a measure of surface tension, and a measure of deformability of the physical surface. The software could be preconfigured with the information on the one or more physical characteristics of the physical surface. In one embodiment, the software is configured to determine the physical characteristics of the surface based on other properties of the surface. For example, the software could determine that shiny specular surfaces are indicative of a lower coefficient of friction (e.g., the surface of a patch of ice). The software could then base the simulation of the interaction between the virtual and physical objects in part on these determined physical characteristics. As an example, a virtual spider could be depicted on the augmented reality device as walking across a physical surface with a low friction coefficient (e.g., a patch of ice). The software could then adjust the behavior of the virtual spider, such that the virtual spider appears to slip or even fall as it makes its way across the physical surface. Advantageously, doing so enhances the realism of the user's augmented reality experience.

FIG. 1 is a block diagram illustrating an augmented reality device configured with a dynamics simulation component, according to one embodiment of the present invention. As shown, the augmented reality device 100 includes a dynamics simulation component 110, camera devices 120, a display device 130 and an accelerometer 140. Generally, the dynamics simulation component 110 is configured to detect interactions between physical objects and virtual objects within a captured scene of a real-world environment and to simulate the dynamics of these interactions to improve the realism of the augmented reality scene when displayed (e.g., on the display device 130). The camera devices 120 may include cameras for capturing a visual scene. As used herein, a visual scene refers to a view(s) of the real-world environment in which the device 100 is being used. For instance, a visual scene may be a series of images (also referred to herein as "frames") of a real-world environment. The camera devices 120 may also include one or more user-facing cameras. Generally, the accelerometer 140 is a device capable of measuring the physical (or proper) acceleration of the augmented reality device 100.

As described above, the dynamics simulation component 110 may be configured to simulate interactions between physical objects and virtual objects within the augmented reality scene displayed on the augmented reality device 100. In doing so, the dynamics simulation component 110 could identify a physical object within a captured visual scene. For instance, the dynamics simulation component 110 could be configured to recognize certain predefined objects within the captured visual scene. As an example, the dynamics simulation component 110 could be pre-configured to identify a particular physical object (e.g., a ball) within a visual scene based on particular characteristics of the physical object (e.g., shape, colors, patterns, etc.).

In one embodiment, the dynamics simulation component 110 is further configured to estimate the depth of the physical object within the captured visual scene. That is, although the captured visual scene may be composed of a plurality of two-dimensional frames, these two-dimensional frames represent a three-dimensional space (e.g., the physical environment in which the augmented device is located). As such, the dynamics simulation component 110 could analyze the captured visual scene in order to determine the depth of the physical object within the three-dimensional space. For example, the dynamics simulation component 110 could be configured to recognize certain predefined physical objects based on geometry information for the objects. Such geometry information could include, for example, the shape and size of the predefined physical objects, allowing the dynamics simulation component 110 to compare objects in a scene with the available geometry information. The dynamics simulation component 110 could use the geometry information to determine the depth of the physical objects within the visual scene. As an example, assume that the geometry information indicates that a particular ball is 3 inches in diameter and that the visual scene includes two instances of that type of ball, where the first instance is shown using 10 pixels of the visual scene and the second instance is shown using 50 pixels of the visual scene. In such an example, the dynamics simulation component 110 could determine that the first instance of the ball is further away from the camera than the second instance of the ball, as the geometry information indicates that the two physical balls are the same size but the first instance is represented using fewer pixels than the second instance.

When a physical object is identified within the scene, the dynamics simulation component 110 could observe motion or movement (if any) of the physical object over time. In one embodiment, the dynamics simulation component 110 is configured to determine a velocity of the physical object. For instance, the dynamics simulation component 110 could monitor the physical object over a plurality of captured frames that make up the visual scene and could determine a speed and a trajectory of the physical object.

Additionally, the dynamics simulation component 110 identifies one or more virtual objects to include in the visual scene displayed on the augmented reality device 100 (e.g., using display 130). As an example, the dynamics simulation component 110 could determine to display a virtual ball within the visual scene. Of course, such an example is without limitation and is provided for illustrative purposes only, and more generally the virtual objects could be any virtual objects capable of being displayed within the virtual scene. In addition, the dynamics simulation component 110 could be configured to identify dynamics properties and kinematics for the virtual objects, e.g., speed, velocity of the virtual objects, virtual objects, etc.

The dynamics simulation component 110 then determines when an interaction occurs between the physical object and one or more of the virtual objects within the visual scene. Generally speaking, an interaction occurs when the physical object and the virtual object(s) touch one another or otherwise impart a force to one another within the three-dimensional augmented reality space represented by the displayed scene on the augmented reality device 100. For example, a physical ball and a virtual ball could be said to interact when the two balls collide with one another within the three-dimensional augmented reality space. As another example, in an embodiment where a virtual animal is displayed as standing upon a physical table top, the user could interact with the virtual animal by moving his or her hand onto the table top in the position where the virtual animal is depicted. As yet another example, a virtual ball could be rendered to roll off a table, where the rate of rate of speed of the ball mimics the actual force of gravity that would act on a physical ball rolling off a table.

In one embodiment, the dynamics simulation component 110 determines depth of the physical object within the three-dimensional space represented by the captured visual scene (e.g., using predefined geometry information for the physical object) and further determines a depth (i.e., a three-dimensional position) of the virtual object within three-dimensional augmented reality space. The dynamics simulation component 110 could then use depth values to render animations depicting more realistic interactions between the virtual and physical objects. For example, if a first object is closer to the camera within the three-dimensional space than a second object, the first object may simply occlude the second object rather than collide with the second object. In other words, the dynamics simulation component 110 may use the depth information in order to consider all three axis of the three-dimensional space.

Upon determining that an interaction has occurred between the physical object and one or more of the virtual objects, the dynamics simulation component 110 could perform a dynamics simulation to model the interaction between the objects. For instance, in an embodiment where a physical ball collides with a virtual ball, the dynamics simulation component 110 could be configured to move the virtual ball in such a manner as to simulate a realistic collision with the physical ball. As an example, the dynamics simulation component 110 could apply a set of dynamics rules that model real-world physics to the virtual ball in order to calculate a virtual force imparted to the virtual ball from the collision with the physical ball, and the dynamics simulation component 110 could further apply the rules in order to determine the effect of the virtual force upon the virtual ball. While in one embodiment these dynamics rules model real-world rules of physics, it is broadly contemplated that other dynamics systems (e.g., low gravity, no gravity, etc.).

In a particular embodiment, after detecting an interaction between a physical object and one or more virtual objects, the dynamics simulation component 110 may apply a force to the physical object in the real-world in order to simulate an interaction with the virtual object in the augmented reality world. For example, the physical object could be a ball rolling on a controlled surface capable of being manipulated by a surface controller. In response to detecting an interaction between the physical and virtual objects, the dynamics simulation component 110 could transmit a message to the controller to apply a force to the physical ball via the controlled surface (e.g., using rotors within the surface, magnets within the surface and/or the ball, etc.). In one embodiment, the physical object itself is configured to manipulate its own movement in response to a request. For example, the physical ball could be configured with a gyroscope capable of altering the motion of the ball. In such an embodiment, the dynamics simulation component 110 could, for instance, detect when the physical ball collides with a virtual object within the augmented reality space and could transmit a signal to a controller within the physical ball, instructing the controller to activate the gyroscope and alter the physical ball's trajectory. As a result, the user viewing the physical ball through the augmented reality device 100 could perceive the physical ball interacting with the virtual ball, thereby creating a more realistic augmented reality experience for the user.

Figure 2A:
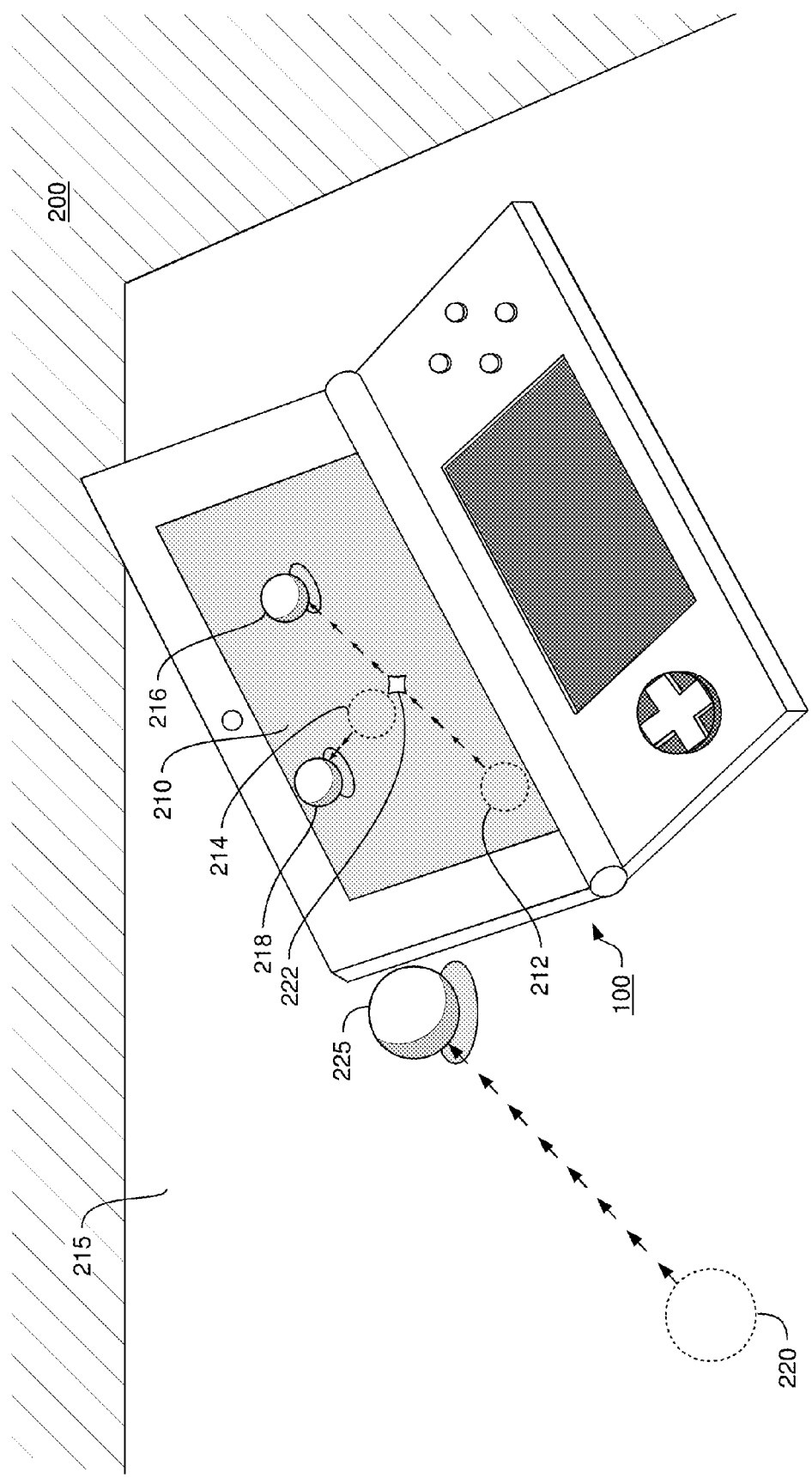
FIGS. 2A-B are diagrams illustrating augmented reality devices, according to embodiments described herein.
Figure 2B:
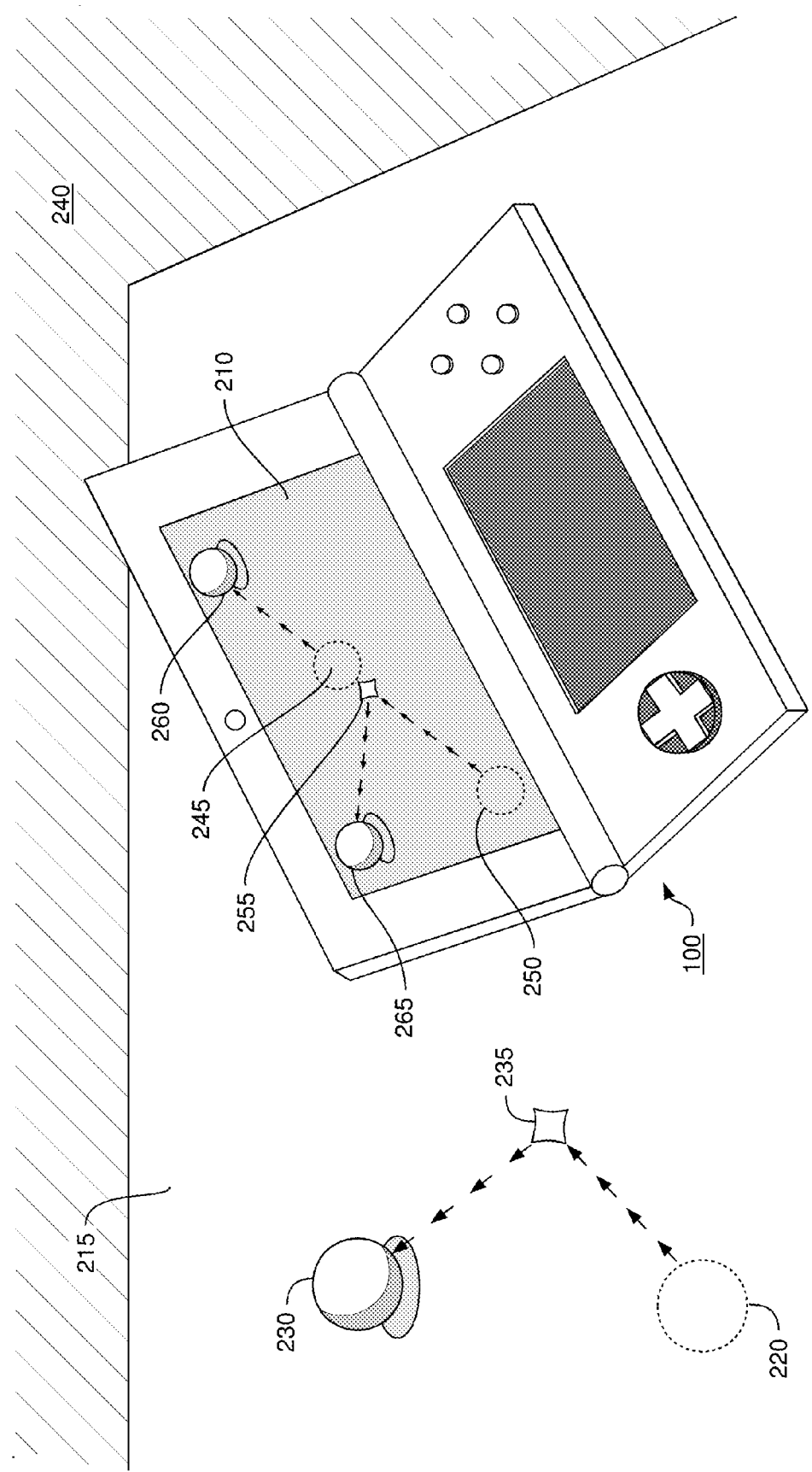

FIGS. 2A-B provide examples illustrating augmented reality devices according embodiments described herein. FIG. 2A illustrates a scene 200 including a table 215, on which a physical ball 225 has been rolled from starting point 220, and an augmented reality device 100 having a display 210. As depicted, the display 210 of the augmented reality device 100 shows a virtual representation 216 of the physical ball 225, with a starting position virtual representation 212 of the starting position 220. Additionally, the display 210 shows a virtual ball 218, with a starting position of 214.

In scene 200, as the physical ball 225 rolled from its starting position 220, the virtual representation 216 was stationary at its starting position 212 on the display 210. However, at intersection point 222, the virtual representation 216 collided with the virtual ball 218 at the virtual ball's starting position 214. Upon detecting the collision between the virtual representation 216 and the virtual ball 218, the dynamics simulation component 110 could adjust the movement of the virtual ball 218 to simulate the dynamics of the interaction between the virtual representation 216 and the virtual ball 218. Thus, in this example, the dynamics simulation component 110 determines that the virtual representation 216 and the virtual ball 218 collided at intersection point 222 and, in response, applies a virtual force to the virtual ball 218, causing the virtual ball 218 to roll from its starting location 214. Doing so may enhance user interactions with the augmented reality device 100, e.g., by enabling virtual objects (e.g., virtual ball 218) to realistically interact with virtual representations of physical objects (e.g., virtual representation 216) on the augmented reality device 100.

In one embodiment, the dynamics simulation component 110 is configured to apply a set of dynamics rules that define dynamics interactions for the augmented reality world. In one embodiment, the set of dynamics rules apply real-world physics to objects within the augmented reality world. However, such an example is for illustrative purposes only and without limitation, and more generally it is contemplated that the dynamics simulation component 110 could be configured to apply any set of dynamics rules to interactions in the augmented reality world (e.g., low gravity physics).

FIG. 2B illustrates another example in which physical objects (and their virtual representations) and virtual objects interact. More specifically, FIG. 2B illustrates a scene 240 which includes the table 215, on which a physical ball 230 has rolled from its starting point 220, altering its course at point 225. Additionally, the scene 240 includes the augmented reality device 100 having a display device 210. The display device 210 shows a virtual representation 265 of the physical ball 230 and a virtual ball 260. Here, the virtual representation 265 has rolled from a starting position 250, corresponding to the starting position 220 of the physical ball 230, and the virtual representation 265 has collided with the virtual ball at intersection point 255.

Upon detecting the collision between the virtual representation 265 and the virtual ball 260, the dynamics simulation component 110 performed a dynamics simulation to model the collision, resulting in the virtual ball 260 rolling from its starting point 245. That is, the dynamics simulation component 110 determined that the collision occurring at intersection point 255 imparted a virtual force onto virtual ball 260, which caused the virtual ball 260 to roll from its original starting location 245. Additionally, the dynamics simulation component 110 determined that, as a result of the collision, the virtual ball 260 in turn imparted a virtual force onto the virtual representation 265. As discussed above, the dynamics simulation component 110 could be configured to alter the movement of a physical object (e.g., physical ball 230) using, for instance, rotors within a controlled surface (e.g., table 215), a gyroscope within the physical object, magnets within a controlled surface and/or the physical object, and so on. More generally, it is broadly contemplated that any mechanism for altering the movement of a physical object may be used by the dynamics simulation component 110, consistent with the functionality described herein.

Returning to the depicted example, the dynamics simulation component 110 has applied the virtual force to the physical ball 230, thus altering the physical ball's trajectory at intersection point 235 (and in turn, altering the virtual representation's trajectory at intersection point 255). Advantageously, doing so provided an enhanced augmented reality experience for users of the augmented reality device 100 by creating a dynamics continuum in which virtual objects can affect the dynamics of real-world objects shown on the augmented reality device, and vice versa.

Figure 3:
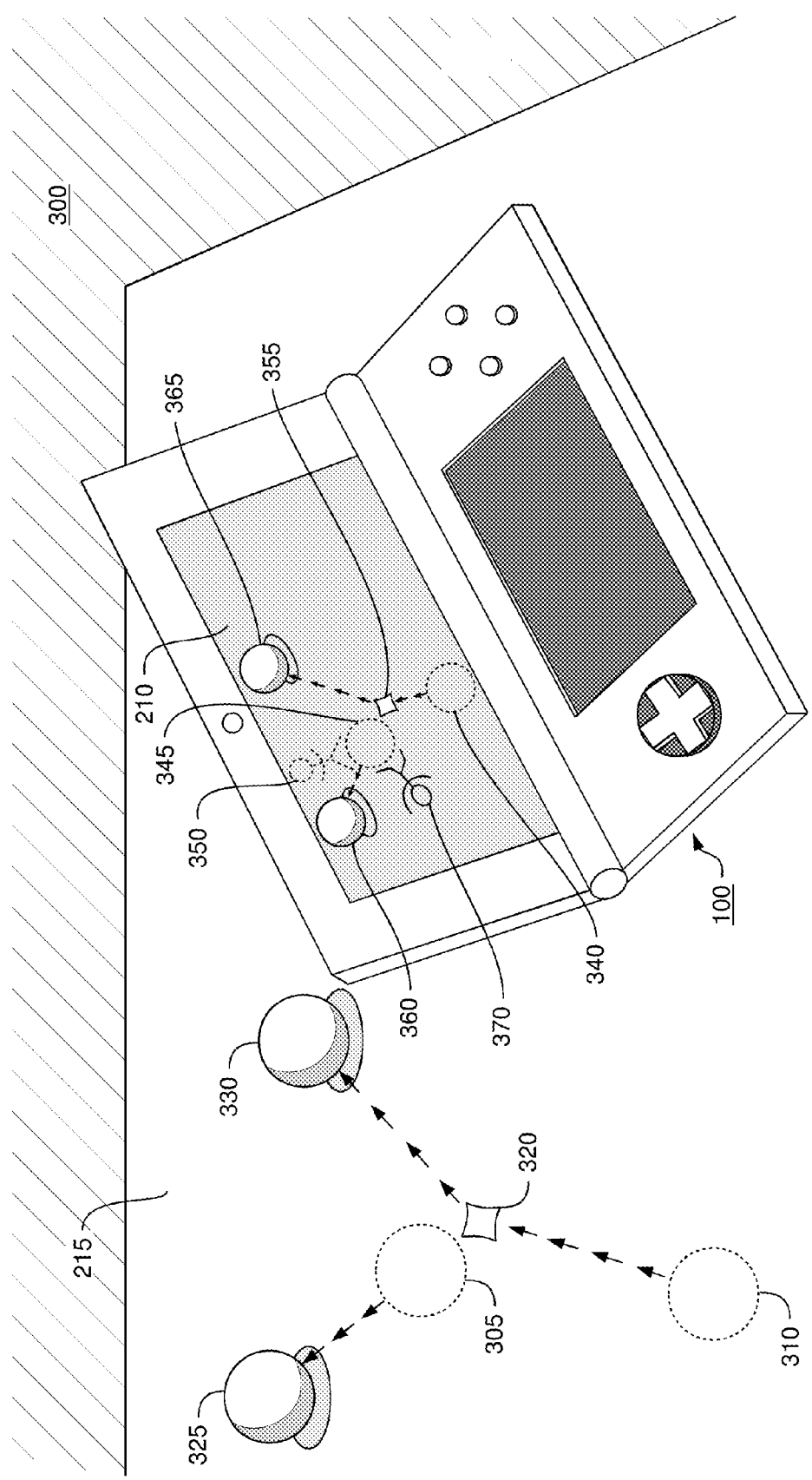
FIG. 3 is a diagram illustrating an augmented reality device, according to one embodiment described herein.

Additionally, the dynamics simulation component 110 can be configured to simulate the dynamics imparted onto a virtual object, as a result of an interaction (e.g., a collision) between two physical objects. For instance, the dynamics simulation component 110 may be configured to adjust the actions of virtual characters within the augmented reality space, such that the virtual characters realistically react to the movement of physical, real-world objects. An example of this is shown in FIG. 3, is a diagram illustrating an augmented reality device, according to one embodiment described herein. More specifically, the scene 300 includes the table 215 and the augmented reality device 100 with display 210. Here, a first physical ball 325 and a second physical ball 330 are shown as having rolled across the table 215 from their respective starting positions of 305 and 310. For purposes of this example, assume that the physical ball 325 was at rest at starting location 305, and the ball 330 was set in motion from its starting location 310, colliding with the stationary first ball 325 at intersection point 320. As a result of the collision, the physical ball 325 rolled from its starting position 305 to its current position, while the ball 330 continued rolling but altered its trajectory before coming to rest at its depicted location.

This collision is illustrated on the display 210 of the augmented reality device 100 as well, where a virtual representation 360 of the first physical ball 325 and virtual representation 365 of the second physical ball 330 are shown as having rolled across the table from their respective starting positions of 345 and 340. Here, the virtual representation 360 was at rest at starting location 345, and the virtual representation 365 was set in motion from its starting location 340, colliding with the stationary virtual representation 360 at intersection point 355. As a result of the collision, the virtual representation 360 rolled from its starting position 345 to its current position, while the virtual representation 365 continued rolling but altered its trajectory before coming to rest at its depicted location.

Additionally, the display 210 of the augmented reality device 100 includes a virtual character 370, having an original position of 350. Thus, for purposes of the current example, assume that the virtual character 370 was balancing on top of the virtual representation 360 in its starting position 345, as shown by starting position 350. However, when the virtual representation 360 collided with the virtual representation 365, the dynamics simulation component 110 in the depicted embodiment determined that the resulting motion of the virtual representation 360 was too fast for the virtual character 370 to keep his balance on top of the virtual representation 360. As a result, the virtual character 370 has fallen from his starting position 350, coming to rest at the depicted location.

By monitoring the movement of real-world objects shown on the augmented reality device's display 210 and simulation dynamics for interactions between the real-world objects and virtual objects within the augmented reality space, embodiments can create a more immersive and realistic augmented reality experience for users. For instance, continuing the above example, a user could reach his or her hand in front of the augmented reality device 100 in the position where the virtual character 370 is located, and the dynamics simulation component 110 could alter the virtual character's actions to simulate the dynamics of interactions between the character 370 and the user's hand. For example, the user could use his or her hand to pick the virtual character 370 back up once he has fallen off the virtual representation 360 and place the virtual character 370 back atop the representation 360 of the ball 325. Advantageously, doing so helps to create an immersive experience for users of the augmented reality device, in which the user can interact with virtual objects and characters shown on the device in real-time and the virtual objects and characters will respond to interactions with the user accordingly.

Of note, the dynamics simulation component 110 could be configured to model a set of physics-based rules when simulating the interaction of the virtual character 370 with the physical and virtual objects of the augmented reality scene. For instance, the simulated behavior of each of the characters arms, legs and joints could account for the presence of gravity or any other external impulse forces. Advantageously, doing so provides a more realistic interaction between the virtual character and objects in the augmented reality environment. Additionally, although various examples provided herein use real-world physics, it is broadly contemplated that the augmented reality world could use other rules of physics. For example, the dynamics simulation component 110 could be configured to simulate interactions between the virtual character and objects within the augmented reality world using a lower coefficient of gravity relative to the real world. More generally, embodiments may be configured to use any physics-based rules consistent with the functionality described herein.

Figure 4:
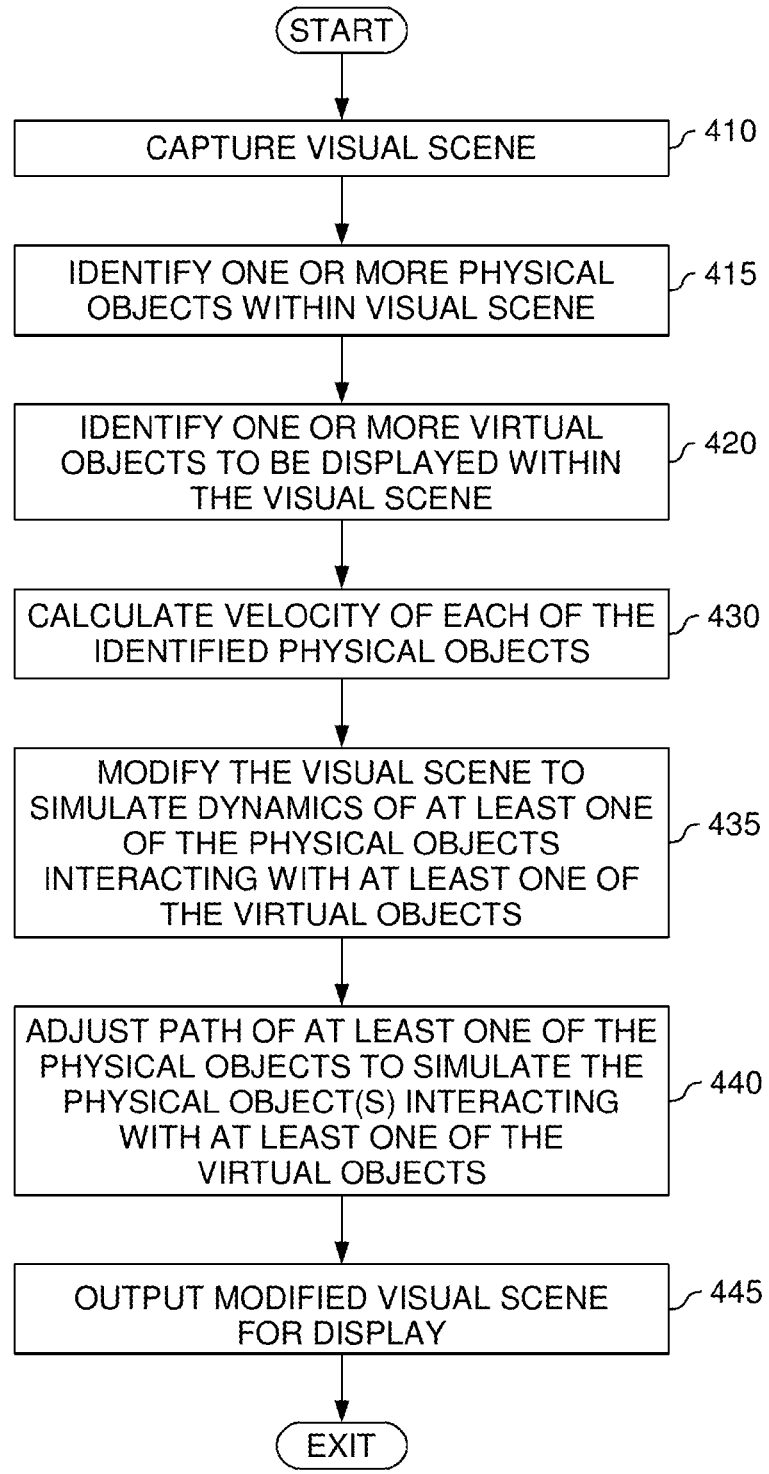
FIG. 4 is a flow diagram illustrating a method of simulating dynamics of interactions between virtual objects and physical objects on an augmented reality device, according to one embodiment described herein.

FIG. 4 is a flow diagram illustrating a method of simulating dynamics of interactions between virtual objects and physical objects on an augmented reality device, according to one embodiment. As shown, the method 400 begins at step 410, where an augmented reality device captures a scene. As discussed above, the visual scene could be a series of frames (i.e., images) captured using a camera of the augmented reality device. The dynamics simulation component 110 then identifies physical objects within the scene (step 415). For instance, the dynamics simulation component 110 could be configured to recognize certain objects based on predefined characteristics of the objects. Such characteristics could include, without limitation, the color, shape, texture, etc. of the objects.

In the depicted embodiment, the dynamics simulation component 110 identifies one or more virtual objects to be displayed within the visual scene (step 420). Of course, although the reference examples discussed above pertain to virtual balls and virtual characters, such examples are provided without limitation and for illustrative purposes. Moreover, it is broadly contemplated that embodiments described herein can be used with any virtual object capable of being inserted into a visual scene and displayed on an augmented reality device.

For each identified physical object, the dynamics simulation component 110 determines a corresponding velocity (i.e., a speed and a trajectory) (step 430). For instance, the dynamics simulation component 110 could store geometry information describing geometrical characteristics of certain physical objects, such as their real-world physical dimensions. The dynamics simulation component 110 may use this geometrical information to determine a depth of the identified physical objects within the visual scene. Additionally, this information could be used to determine the real-world velocity of these objects (e.g., by monitoring the object's position over a series of frames).

As shown, the dynamics simulation component 110 uses this velocity information to model the dynamics of one or more of the physical objects interacting with one or more of the virtual objects (step 435). For instance, when the simulation component 110 determines a physical ball has collided with a virtual ball within the augmented reality space, it could use the velocity at which the physical ball is travelling to determine an amount of virtual force to apply to the virtual ball. This virtual force information could then be used to alter the motion of the virtual ball (e.g., causing the virtual ball to roll away as a result of the collision with the physical ball).

Additionally, in this example, the dynamics simulation component 110 could also adjust the path of at least one physical objects to simulate the physical object interacting with at least one of the virtual objects (step 440). For instance, the dynamics simulation component 110 could transmit a message to a controller within the physical object, instructing the physical object to move in a certain direction as a result of the collision with the virtual object. As another example, the dynamics simulation component 110 could transmit a message to a controller associated with the surface on which the physical object is positioned, instructing the surface to alter the physical object's motion as a result of the collision (e.g., using magnets within the surface and/or the physical object). Of course, such examples are provided without limitation and for illustrative purposes only, and more generally, it is broadly contemplated that any mechanism for altering the motion of the physical object may be used, consistent with the functionalities described herein.

As discussed above, in one embodiment, the dynamics simulation component 110 could determine one or more physical characteristics of a physical surface within the scene. Such physical characteristics could include, without limitation, a measure of friction, a measure of surface tension, and a measure of deformability of the physical surface. The dynamics simulation component 110 could be preconfigured with the information on the one or more physical characteristics of the physical surface. For instance, the dynamics simulation component 110 could identify a type of a surface within the scene and could then access preconfigured physical characteristics information for the identified surface. In one embodiment, the dynamics simulation component 110 is configured to determine the physical characteristics of the surface based on other properties of the surface. For example, the dynamics simulation component 110 could determine that shiny specular surfaces are indicative of a lower coefficient of friction (e.g., the surface of a patch of ice). The dynamics simulation component 110 could then base the simulation of the interaction between the virtual and physical objects in part on these determined physical characteristics. For instance, as discussed above, a virtual spider could be depicted on the augmented reality device as walking across a physical surface with a low friction coefficient (e.g., a patch of ice). The dynamics simulation component 110 could adjust the behavior of the virtual spider, such that the virtual spider appears to slip or even fall as it makes its way across the physical surface. Advantageously, doing so enhances the realism of the user's augmented reality experience.

At step 445, the dynamics simulation component 110 renders frames of the visual scene on the augmented reality device that account for the modeled interaction between the virtual objects and the objects present in the scene. Advantageously, embodiments help to create a more realistic augmented reality experience for users of the augmented reality device. This, in turn, create a more immersive experience for the user, as the user can use physical objects (e.g., the user's hand) to interact with virtual objects displayed on the augmented reality device.

Figure 5:
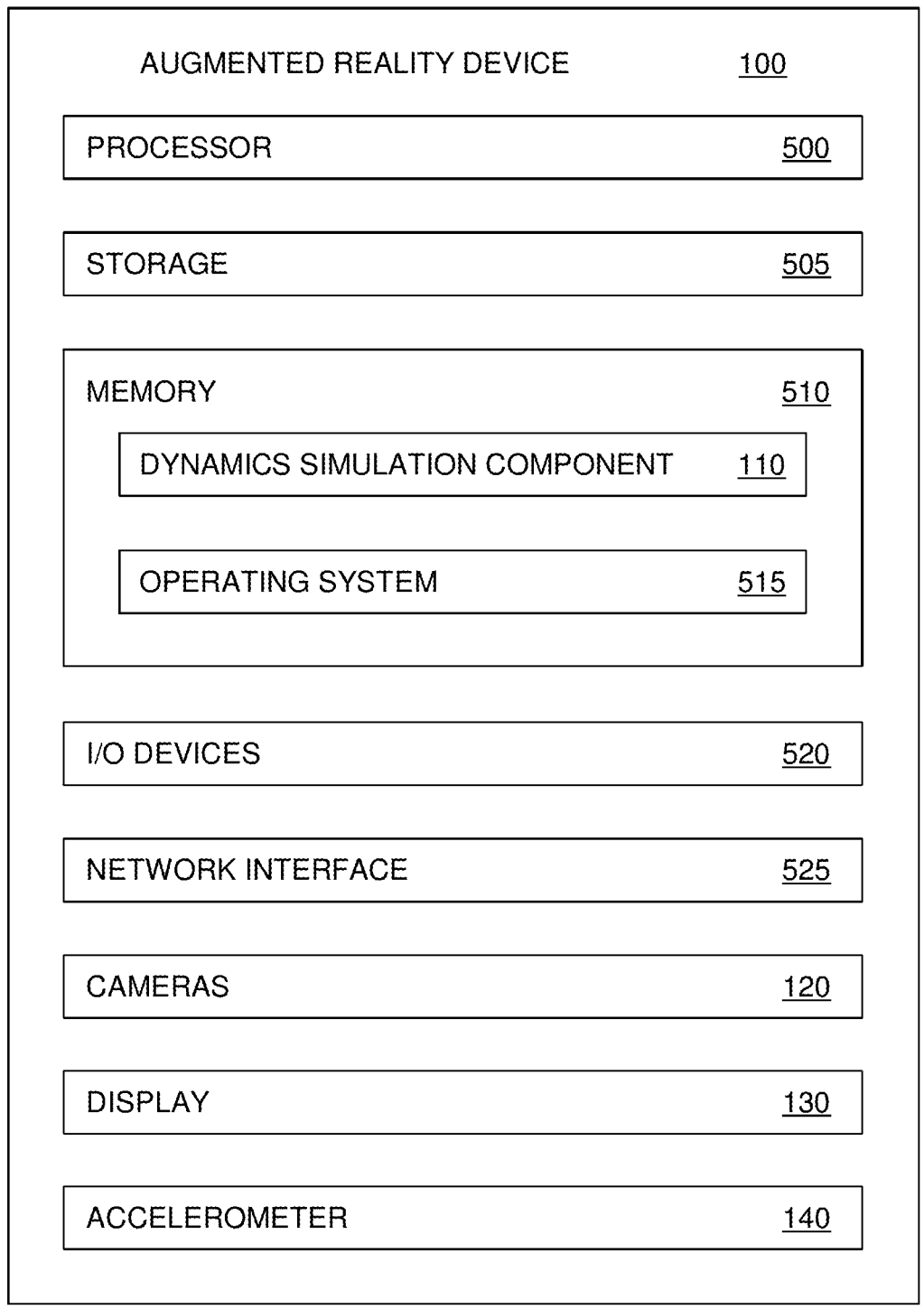
FIG. 5 is a block diagram illustrating an augmented reality device configured with a dynamics simulation component, according to one embodiment described herein.

FIG. 5 is a block diagram illustrating an augmented reality device configured with a dynamics simulation component, according to one embodiment described herein. In this example, the augmented reality device 100 includes, without limitation, a processor 500, storage 505, memory 510, I/O devices 520, a network interface 525, camera devices 120, a display devices 130 and an accelerometer device 140. Generally, the processor 500 retrieves and executes programming instructions stored in the memory 510. Processor 500 is included to be representative of a single CPU, multiple CPUs, a single CPU having multiple processing cores, GPUs having multiple execution paths, and the like. The memory 510 is generally included to be representative of a random access memory. The network interface 525 enables the augmented reality device 100 to connect to a data communications network (e.g., wired Ethernet connection or an 802.11 wireless network). Further, while the depicted embodiment illustrates the components of a particular augmented reality device 100, one of ordinary skill in the art will recognize that augmented reality devices may use a variety of different hardware architectures. Moreover, it is explicitly contemplated that embodiments of the invention may be implemented using any device or computer system capable of performing the functions described herein.

The memory 510 represents any memory sufficiently large to hold the necessary programs and data structures. Memory 510 could be one or a combination of memory devices, including Random Access Memory, nonvolatile or backup memory (e.g., programmable or Flash memories, read-only memories, etc.). In addition, memory 510 and storage 505 may be considered to include memory physically located elsewhere; for example, on another computer communicatively coupled to the augmented reality device 100. Illustratively, the memory 510 includes a dynamics simulation component 110 and an operating system 515. The operating system 515 generally controls the execution of application programs on the augmented reality device 100. Examples of operating system 515 include UNIX, a version of the Microsoft Windows® operating system, and distributions of the Linux® operating system. (Note: Linux is a trademark of Linus Torvalds in the United States and other countries.) Additional examples of operating system 515 include custom operating systems for gaming consoles, including the custom operating systems for systems such as the Nintendo DS® and Sony PSP®.

The I/O devices 520 represent a wide variety of input and output devices, including displays, keyboards, touch screens, and so on. For instance, the I/O devices 520 may include a display device used to provide a user interface. As an example, the display may provide a touch sensitive surface allowing the user to select different applications and options within an application (e.g., to select and control a virtual object). Additionally, the I/O devices 520 may include a set of buttons, switches or other physical device mechanisms for controlling the augmented reality device 100. For example, the I/O devices 520 could include a set of directional buttons used to control aspects of a video game played using the augmented reality device 100.

Generally, the dynamics simulation component 110 controls interactions between virtual objects displayed by the augmented reality device 100 (e.g., using display 130) and physical objects outside of the device 100 (e.g., a physical ball photographed using cameras 120). The dynamics simulation component 110 may receive a visual scene for display. For instance, the visual scene could be a series of frames captured using cameras 120 of the augmented reality device 100. The dynamics simulation component 110 could identify one or more physical objects within the visual scene, and could further identify one or more virtual objects to be displayed within the visual scene. The dynamics simulation component 110 could further monitor the movement of the physical objects and the virtual objects to determine when the objects interact with one another. The dynamics simulation component 110 could then simulate the dynamics of the interactions between the physical object and the one or more virtual objects within the visual scene. The output of this simulation could then be displayed using the display 130. Advantageously, doing so helps to provide a more realistic and immersive augmented reality experience by allowing physical objects to interact with virtual objects displayed on the augmented reality device 100, and vice versa.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access geometrical data available in the cloud. For example, a dynamics simulation component 110 could execute on an augmented reality device 100 operated by a user and could collect geometrical information pertaining to the user's current environment (e.g., the dimensions of physical objects within the user's current environment). In such a case, the dynamics simulation component 110 could transmit the collected data to a computing system in the cloud for storage. When the user again returns to same environment, the dynamics simulation component 110 could query the computer system in the cloud to retrieve the geometrical data and could then use the retrieved data to perform dynamics simulations between physical objects in the user's physical environment and virtual objects displayed on the augmented reality device 100. For instance, the dynamics simulation component 110 could use the geometrical information to determine the depth of physical objects within a captured visual scene. Doing so allows a user to access this information from any device or computer system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for simulating interactions using an augmented reality device, comprising:
   capturing a visual scene for display, wherein the visual scene includes a depiction of a first physical object within a physical environment and wherein the visual scene is captured using one or more camera devices;
   simulating, by operation of one or more computer processors of the augmented reality device, a dynamic interaction between the first physical object and one or more virtual objects;
   calculating a velocity of a first one of the one or more virtual objects, resulting from the simulated dynamic interaction between the first physical object and the first virtual object;
   selecting one of a plurality of predefined behaviors for a virtual character to perform in response to the dynamic interaction, wherein the virtual character is distinct from the one or more virtual objects, and wherein the selection is based on a determination that the calculated velocity of the first virtual object exceeds a predefined threshold amount of velocity;

rendering a sequence of frames for display that depict the dynamic interaction between the first physical object and the one or more virtual objects and further depict a representation of the virtual character performing the determined behavior; and transmitting an instruction to a control device, to cause the control device to activate an actuator associated with a first physical device in order to move the first physical object at a specified speed and trajectory, wherein the speed and trajectory are dynamically determined based on the dynamic interaction between the physical object and the one or more virtual objects within the visual scene.

2. The method of claim 1, further comprising:

identifying predefined geometry information for the first physical object, wherein the predefined geometry information includes at least a measure of size for the first physical object; and estimating a depth measure of the physical object within the visual scene, based on the identified predefined geometry information, wherein simulating the dynamic interaction is further based on the estimated depth measure of the first physical object.

3. The method of claim 1, further comprising:

monitoring a motion of the first physical object within the visual scene; and estimating a velocity of the first physical object based on the monitored motion.

4. The method of claim 3, further comprising:

determining a velocity of the one or more virtual objects to be displayed within the visual scene, wherein the dynamics simulation is further based on the determined velocity of the first physical object and the determined velocity of the one or more virtual objects.

5. The method of claim 1, wherein simulating a dynamic interaction between the first physical object and the one or more virtual objects is further based on a set of dynamics rules that define dynamics interactions for visual scenes displayed on the augmented reality device.

6. The method of claim 1, wherein simulating the dynamic interaction between the first physical object and one or more virtual objects further comprises:

determining one or more characteristics of the first physical object; and adjusting behavior of the one or more virtual objects as part of the dynamic interaction based on the determined one or more characteristics.

7. The method of claim 1, wherein the first physical object is substantially spherical in shape, and wherein the actuator comprises a gyroscope disposed within the first physical object that, when activated, dynamically alters a trajectory of the first physical object such that the first physical object moves at the specified velocity.

8. The method of claim 1, wherein the actuator is disposed within the physical environment and forcibly coupled to the first physical object at a distance.

9. The method of claim 8, wherein the actuator further comprises one or more controllable magnets disposed within a surface on which the first physical object is positioned, wherein a second magnet is disposed within the first physical object, and wherein the one or more controllable magnets are moved in order to dynamically move the first physical object at the specified speed and trajectory within the physical environment.

10. The method of claim 1, wherein at least one of the sequence of frames depicts the virtual character balancing atop a first one of the one or more physical objects, wherein the first physical object is spherical in shape, wherein the selected predefined behavior comprises the virtual character falling from atop the first spherical physical object, and the method further comprising:

monitoring movement of the first physical object to detect a collision;

determining that the first spherical physical object is moving at the calculated velocity as a result of the collision; and rendering a subsequent sequence of frames, depicting the virtual character performing the selected predefined behavior and falling from atop the first spherical physical object, as a result of the calculated velocity of the first spherical physical object exceeding the predefined threshold amount of velocity as a result of the detected collision.

11. The method of claim 1, further comprising:

determining a surface within the physical environment on which the first physical object is positioned; and retrieving a predefined profile corresponding to the surface, wherein the predefined profile describes a plurality of attributes of the surface, wherein the dynamic interaction between the first physical object and one or more virtual objects based at least in part on the plurality of attributes of the surface described in the predefined profile.

12. The method of claim 1, further comprising:

determining a measure of force to apply to the physical object, based on the dynamic interaction and the plurality of attributes of the surface;

transmitting the measure of force to the control device, to cause the control device to activate the actuator, based on a determined manner associated with the predefined profile.

13. An augmented reality device, comprising:

a processor; and a memory containing a program that, when executed by the processor, performs an operation for simulating interactions using an augmented reality device, comprising:

capturing a visual scene for display, wherein the visual scene includes a depiction of a first physical object within a physical environment and wherein the visual scene is captured using one or more camera devices;

simulating, by operation of one or more computer processors of the augmented reality device, a dynamic interaction between the first physical object and one or more virtual objects;

calculating a velocity of a first one of the one or more virtual objects, resulting from the simulated dynamic interaction between the first physical object and the first virtual object;

selecting one of a plurality of predefined behaviors for a virtual character to perform in response to the dynamic interaction, wherein the virtual character is distinct from the one or more virtual objects, and wherein the selection is based on a determination that the calculated velocity of the first virtual object exceeds a predefined threshold amount of velocity;

rendering a sequence of frames for display that depict the dynamic interaction between the first physical object and the one or more virtual objects and further depict a representation of the virtual character performing the determined behavior; and transmitting an instruction to a control device, to cause the control device to activate an actuator associated with a first physical device in order to move the first physical object at a specified speed and trajectory, wherein the speed and trajectory are dynamically determined based on the dynamic interaction between the physical object and the one or more virtual objects within the visual scene.

14. The augmented reality device of claim 13, the operation further comprising:
identifying predefined geometry information for the first physical object, wherein the predefined geometry information includes at least a measure of size for the first physical object; and
estimating a depth measure of the physical object within the visual scene, based on the identified predefined geometry information,
wherein simulating the dynamic interaction is further based on the estimated depth measure of the first physical object.

15. The augmented reality device of claim 13, further comprising:
monitoring a motion of the first physical object within the visual scene; and
estimating a velocity of the first physical object based on the monitored motion.

16. The augmented reality device of claim 15, further comprising:
determining a velocity of the one or more virtual objects to be displayed within the visual scene,
wherein the dynamics simulation is further based on the determined velocity of the first physical object and the determined velocity of the one or more virtual objects.

17. The augmented reality device of claim 13, wherein simulating a dynamic interaction between the first physical object and the one or more virtual objects is further based on a set of dynamics rules that define dynamics interactions for visual scenes displayed on the augmented reality device.

18. The augmented reality device of claim 13, wherein simulating the dynamic interaction between the first physical object and one or more virtual objects further comprises:
determining one or more characteristics of the first physical object; and
adjusting behavior of the one or more virtual objects as part of the dynamic interaction based on the determined one or more characteristics.

19. A non-transitory computer-readable medium containing a program that, when executed, performs an operation for simulating interactions using an augmented reality device, comprising:
capturing a visual scene for display, wherein the visual scene includes a depiction of a first physical object within a physical environment and wherein the visual scene is captured using one or more camera devices;
simulating, by operation of one or more computer processors of the augmented reality device, a dynamic interaction between the first physical object and one or more virtual objects;
calculating a velocity of a first one of the one or more virtual objects, resulting from the simulated dynamic interaction between the first physical object and the first virtual object;
selecting one of a plurality of predefined behaviors for a virtual character to perform in response to the dynamic interaction, wherein the virtual character is distinct from the one or more virtual objects, and wherein the selection is based on a determination that the calculated velocity of the first virtual object exceeds a predefined threshold amount of velocity;
rendering a sequence of frames for display that depict the dynamic interaction between the first physical object and the one or more virtual objects and further depict a representation of the virtual character performing the determined behavior; and
transmitting an instruction to a control device, to cause the control device to activate an actuator associated with a first physical device in order to move the first physical object at a specified speed and trajectory, wherein the speed and trajectory are dynamically determined based on the simulated dynamic interaction between the physical object and the one or more virtual objects within the visual scene.

20. The non-transitory computer-readable medium of claim 19, the operation further comprising:
identifying predefined geometry information for the first physical object, wherein the predefined geometry information includes at least a measure of size for the first physical object; and
estimating a depth measure of the physical object within the visual scene, based on the identified predefined geometry information,
wherein simulating the dynamic interaction is further based on the estimated depth measure of the first physical object.

21. The non-transitory computer-readable medium of claim 19, further comprising:
monitoring a motion of the first physical object within the visual scene; and
estimating a velocity of the first physical object based on the monitored motion.

22. The non-transitory computer-readable medium of claim 21, further comprising:
determining a velocity of the one or more virtual objects to be displayed within the visual scene,
wherein the dynamics simulation is further based on the determined velocity of the first physical object and the determined velocity of the one or more virtual objects.

23. The non-transitory computer-readable medium of claim 19, wherein simulating a dynamic interaction between the first physical object and the one or more virtual objects is further based on a set of dynamics rules that define dynamics interactions for visual scenes displayed on the augmented reality device.

24. The non-transitory computer-readable medium of claim 19, wherein simulating the dynamic interaction between the first physical object and one or more virtual objects further comprises:
determining one or more characteristics of the first physical object; and
adjusting behavior of the one or more virtual objects as part of the dynamic interaction based on the determined one or more characteristics.

* * * * *